(12) United States Patent
Anzai et al.

(10) Patent No.: US 7,040,446 B2
(45) Date of Patent: May 9, 2006

(54) POWER TRAIN SUPPORT APPARATUS

(75) Inventors: Kouji Anzai, Yokohama (JP);
Shinnosuke Gotoh, Kanagawa (JP);
Hiroaki Akazawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 187 days.

(21) Appl. No.: 10/405,629

(22) Filed: Apr. 3, 2003

(65) Prior Publication Data

US 2003/0209380 A1  Nov. 13, 2003

(30) Foreign Application Priority Data

May 10, 2002 (JP) .............................. 2002-135810

(51) Int. Cl.
*B62D 27/06* (2006.01)
*B62D 21/00* (2006.01)

(52) U.S. Cl. ...................... 180/312; 180/234; 180/274; 280/784; 296/187.09

(58) Field of Classification Search ................ 180/312, 180/274, 232, 298; 280/784; 296/35.2, 296/187.03, 187.09
See application file for complete search history.

(56) References Cited

U.S. PATENT DOCUMENTS

| 3,752,247 A | * | 8/1973 | Schwenk | ..................... 180/232 |
| 3,774,712 A | * | 11/1973 | Froumajou | ................... 180/232 |
| 4,449,603 A | * | 5/1984 | Langwieder et al. | ........ 180/232 |
| 5,492,193 A | * | 2/1996 | Guertler et al. | ............. 180/232 |
| 6,131,685 A |  | 10/2000 | Sakamoto et al. | |
| 6,722,696 B1 | * | 4/2004 | Sonomura et al. | .......... 280/784 |

FOREIGN PATENT DOCUMENTS

| DE | 3224935 A | * | 1/1984 |
| GB | 2 329 877 A |   | 4/1999 |
| JP | 7-164894 A |   | 6/1995 |
| JP | 9-240291 A |   | 9/1997 |
| JP | 11-91620 A |   | 4/1999 |
| JP | 2002-2310 A |   | 1/2002 |
| JP | 2002-12040 A |   | 1/2002 |
| JP | 2002-127762 A |   | 5/2002 |

* cited by examiner

*Primary Examiner*—David R. Dunn
(74) *Attorney, Agent, or Firm*—Foley & Lardner LLP (57) ABSTRACT

A power train support apparatus supports a power train which is adapted to be dropped with a load greater than or equal to a given value thereof applied substantially in a fore-and-aft direction of a vehicular body. The power train support apparatus includes: a support bracket mounted to the power train. The support bracket includes an upper connection at least which is suspended with a support member of the vehicular body. The support bracket is formed with a breakable portion which is breakable with a load greater than or equal to a given value thereof applied substantially downward from the upper connection.

20 Claims, 6 Drawing Sheets

POWER TRAIN SUPPORT APPARATUS

BACKGROUND OF THE INVENTION

1. Field of the Invention

The present invention relates to a power train support apparatus for supporting a power train including an engine, a transaxle and the like of a vehicle.

2. Description of the Related Art

Japanese Patent Unexamined Publication No. Heisei 7 (1995)-164894 (=JP7164894 in its English abstract) discloses a power train support apparatus (referred to as "ENGINE SUPPORT STRUCTURE" in its English abstract).

Moreover, U.S. Pat. No. 6,131,685 {equivalent of Japanese Patent Unexamined Publication No. Heisei 9 (1997)-240291} discloses a power train support apparatus (referred to as "POWER TRAIN SUPPORTING APPARATUS").

BRIEF SUMMARY OF THE INVENTION

According to Japanese Patent Unexamined Publication No. Heisei 7 (1995)-164894, inhibiting the power train's drop which may be caused by a slight shock requires such a construction in which the power train can drop after making a rearward movement to a certain extent.

Notwithstanding the above requirement in terms of construction, by the time the power train makes the rearward movement to such an extent that the power train drops in a small engine room of the vehicle, auxiliary equipment and the like of the power train may interfere with side members and the like. As a result, it is difficult to assuredly move the power train downward insubstantially a head-on collision of the vehicle—unsolved problem.

According to U.S. Pat. No. 6,131,685 {equivalent of Japanese Patent Unexamined Publication No. Heisei 9 (1997)-240291}, the power train is supposed to drop from a third engine mount in accordance with the curved portion {of the sub-side member} bending downward in substantially a head-on collision of the vehicle.

Due to the above the power train's drop, the power train supporting apparatus according to U.S. Pat. No. 6,131,685 has the following limitations in terms of configuration and disposing method:

The insulator is breakable with a load greater than or equal to its given value.

The bolt or pin engaging the front side member's side of the insulator with the power train's side of the insulator can assuredly drop downward.

In sum, applying insulators with different configurations and varying dispositions are impossible—unsolved problem.

It is an object of the present invention to provide a power train support apparatus for assuredly moving downward a power train with a load (greater than or equal to its given value) applied substantially in a fore-and-aft direction of a vehicular body.

It is another object of the present invention to provided the power train support apparatus that can deregulate limitations on configuration and disposing method of a support member supporting the power train.

According to an aspect of the present invention, there is provided a power train support apparatus for supporting a power train which is adapted to be dropped with a load greater than or equal to a given value thereof applied substantially in a fore-and-aft direction of a vehicular body. The power train support apparatus comprises: a support bracket mounted to the power train. The support bracket comprises an upper connection at least which is suspended with a support member of the vehicular body. The support bracket is formed with a breakable portion which is breakable with a load greater than or equal to a given value thereof applied substantially downward from the upper connection.

The other objects and features of the present invention will become understood from the following description with reference to the accompanying drawings.

DETAILED DESCRIPTION OF THE EMBODIMENT

In the following, various embodiments of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

Figure 1:
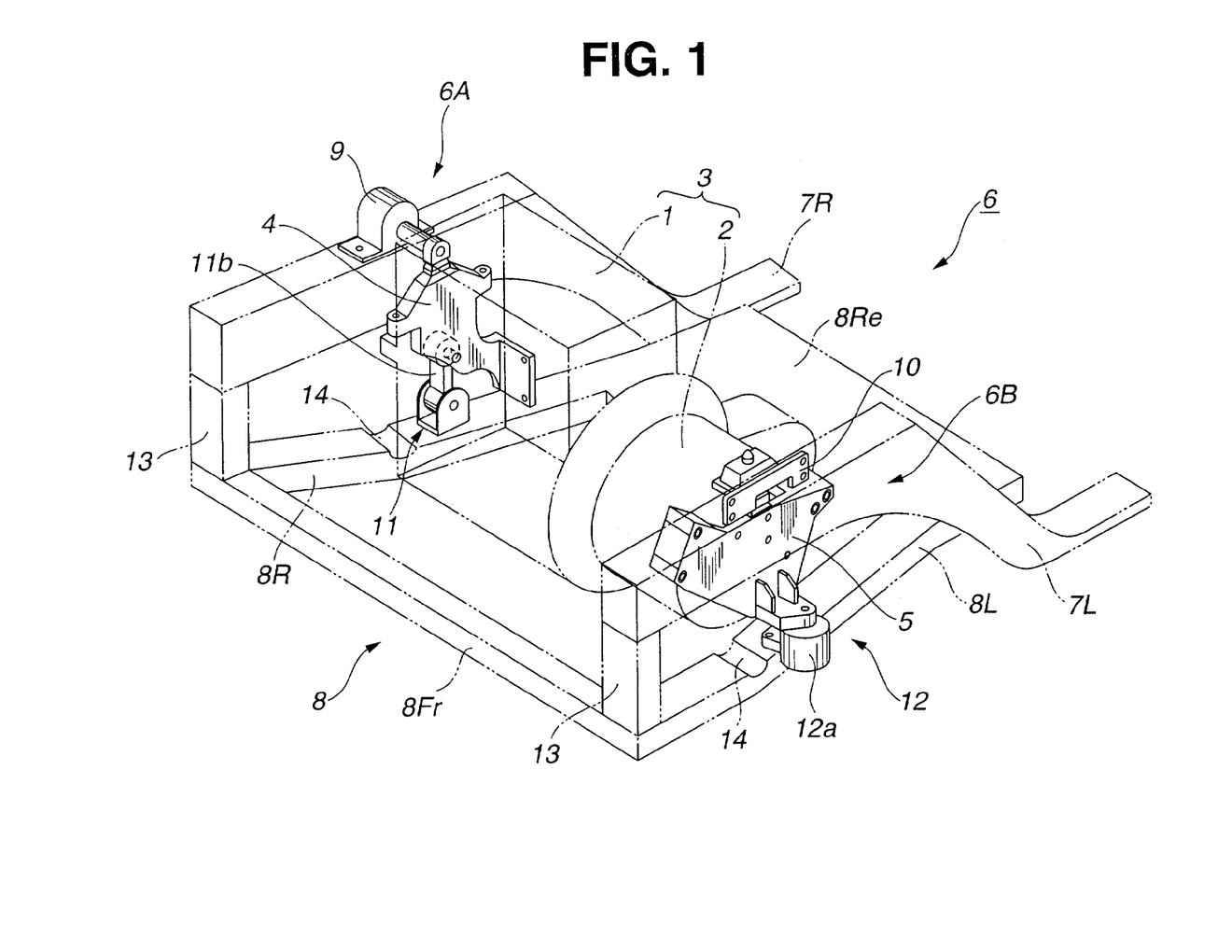
FIG. 1 is an overall view of a power train support apparatus 3 in combination with a vehicular body support member 6, according to an embodiment of the present invention.

As is seen in FIG. 1, there is provided a power train support apparatus which is applied to a front engine and front wheel drive vehicle, according to an embodiment of the present invention.

There is provided an engine 1 as a driving source of revolution. There is provided a transaxle 2 which is a transmission unitedly connected in line with an output side of engine 1. Engine 1 (located sidewise) and transaxle 2 constitute a power train 3. A first support bracket 4 is mounted on engine 1's side of power train 3, while a second support bracket 5 is mounted on transaxle 2's side of power train 3. Each of first support bracket 4 and second support bracket 5 is suspended with a vehicular body support member 6.

Figure 2:
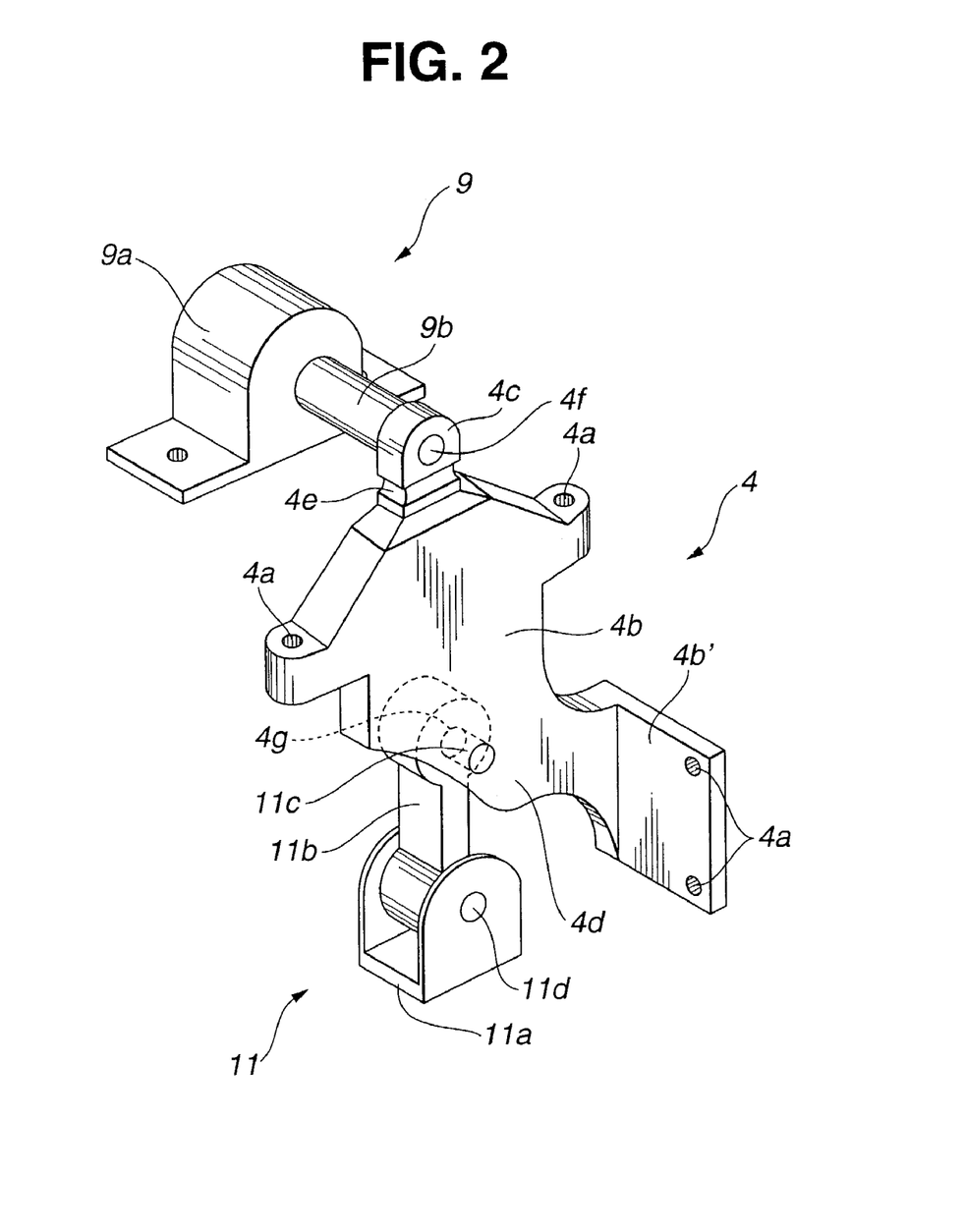
FIG. 2 is an enlarged view of a first support bracket 4.

As is seen in FIG. 2, first support bracket 4 has a support bracket body 4b, an upper connection 4c, a lower connection 4d, and a breakable portion 4e which are so united as to constitute first support bracket 4.

For tightening first support bracket 4 to engine 1's side of power train 3 by means of a bolt and the like, support bracket body 4b is formed with a through hole 4a. Upper connection 4c connected to a first suspension member 9 is positioned higher than support bracket body 4b. Lower connection 4d connected to a lower connecting member 11 is positioned lower than support bracket body 4b. Breakable portion 4e is formed lower than upper connection 4c, and higher than a portion mounted to power train 3.

Breakable portion 4e is breakable with a load (greater than or equal to its given value) applied downward from upper connection 4c.

Support bracket body 4b has a first face which is tightened, by means of a bolt and the like, to a position higher than a protrusion on a side face of power train 3.

Support bracket body 4b further has a mount plate 4b'. Mount plate 4b' bends substantially perpendicularly from the first face of support bracket body 4b. Moreover, mount plate 4b' has a face contacting a rear face of power train 3. With this, mount plate 4b' is tightened, by means of a bolt and the like, to power train 3.

As is seen in FIG. 2, for fixing a connecting shaft 9b of first suspension member 9, upper connection 4c is formed with a through hole 4f—to be described afterward. Upper connection 4c is shaped substantially into a tongue.

As is seen in FIG. 2, for fixing a connecting shaft 11c of lower connecting member 11, lower connection 4d is formed with a through hole 4g—to be described afterward.

Breakable portion 4e is a cutout which is formed in the following manner:
Cutting partly an outer periphery of a lower area of upper connection 4c such that the thus cut area can be smaller in cross section than the other area.

Breakable portion 4e is so designed as to be broken with the downward load (for example, about 25 kN) applied to breakable portion 4e.

Figure 3:
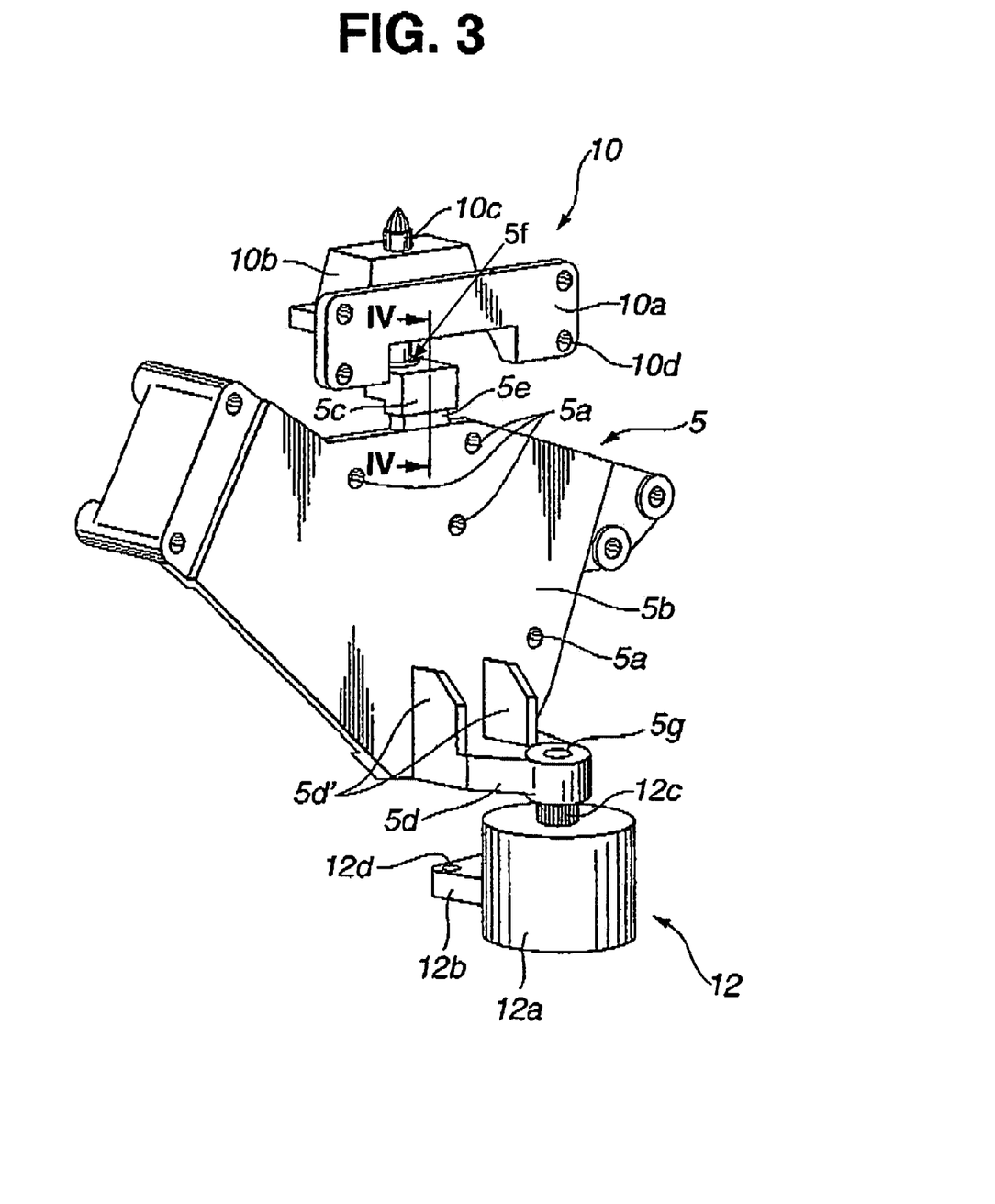
FIG. 3 is an enlarged view of a second support bracket 5.

As is seen in FIG. 3, second support bracket 5 has a support bracket body 5b, an upper connection 5c, a lower connection 5d, and a breakable portion 5e which are so united as to constitute second support bracket 5.

For tightening second support bracket 5 to a side face of transaxle 2's side of power train 3 by means of bolts and the like, support bracket body 5b is formed with a plurality of through holes 5a. Support bracket body 5b is shaped substantially into a plate. Upper connection 5c connected to second suspension member 10 is positioned higher than support bracket body 5b. Upper connection 5c is disposed substantially in the horizontal center above support bracket body 5b in such a manner as to protrude upward. Lower connection 5d connected to a lower connecting member 12 is positioned lower than support bracket body 5b. With respect to a forward direction of the vehicle, lower connection 5d protrudes leftward. Broken portion 5e is formed lower than upper connection 5c, and higher than a portion mounted to power train 3. In other words, broken portion 5e is formed in an area covered by an upper end of support bracket body 5b.

Breakable portion 5e is breakable with a load (greater than or equal to its given value) applied downward to support bracket body 5b.

For fixing a connecting shaft 10c of second suspension member 10, upper connection 5c is formed with a through hole 5f—to be described afterward. Upper connection 5c is a block which is shaped substantially into a tongue in plan view.

With respect to the forward direction of the vehicle, lower connection 5d protrudes substantially perpendicularly relative to support bracket body 5b. For fixing a connecting shaft 12c of lower connecting member 12, lower connection 5d is formed with a through hole 5g—to be described afterward. Moreover, lower connection 5d is shaped substantially into a triangle pole. For securing a certain strength, lower connection 5d has a pair of reinforcing ribs 5d' opposing each other.

Figure 4:
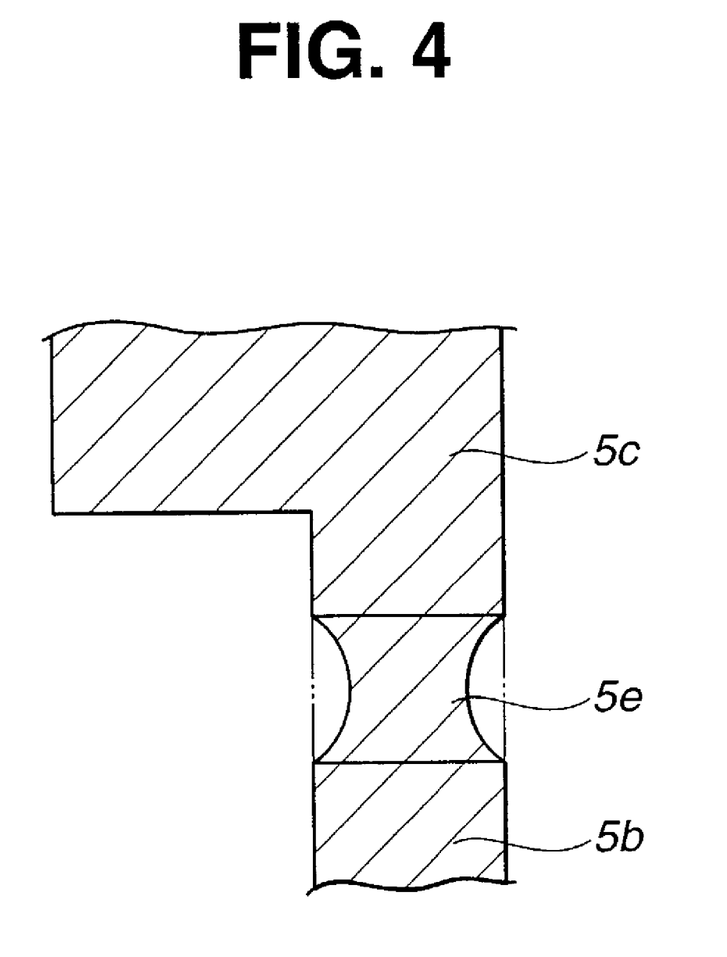
FIG. 4 is a cross section of a breakable portion 5e, taken along lines IV—IV in FIG. 3.

Breakable portion 5e is a cutout which is formed in the following manner:
FIG. 4 shows an enlarged view of a cross section taken along lines IV—IV in FIG. 3. Cutting partly an outer periphery of a lower area of upper connection 5c.

Like breakable portion 4e, breakable portion 5e is so designed as to be broken with the downward load (for example, about 25 kN) applied to breakable portion 5e.

A strength connecting first suspension member 9 to upper connection 4c is designed higher than a strength of breakable portion 4e disposed between upper connection 4c and support bracket body 4b. In addition, a strength connecting lower connecting member 11 to lower connection 4d is designed higher than the strength of breakable portion 4e disposed between upper connection 4c and support bracket body 4b.

Likewise, a strength connecting second suspension member 10 to upper connection 5c is designed higher than a strength of breakable portion 5e disposed between upper connection 5c and support bracket body 5b. In addition, a strength connecting lower connecting member 12 to lower connection 5d is designed higher than the strength of breakable portion 5e disposed between upper connection 5c and support bracket body 5b.

As is seen in FIG. 1, vehicular body support member 6 is constituted of: a pair of a front right member 7R and a front left member 7L, a sub-frame 8, first suspension member 9, second suspension member 10, lower connecting member 11, and lower connecting member 12.

Each of front right member 7R and front left member 7L is a main skeleton member extending in a fore-and-aft direction of the vehicular body.

Sub-frame 8 is disposed lower than front right member 7R and front left member 7L. Moreover, sub-frame 8 is a sub-skeleton member which bends downward with a load (greater than or equal to its given value) applied in the fore-and-aft direction of the vehicular body. Sub-frame 8 is shaped substantially into a girder in plan view.

First suspension member 9 is fixed to front right member 7R in such a manner as to suspend an upper side of first support bracket 4.

Second suspension member 10 is fixed to front left member 7L in such a manner as to suspend an upper side of second support bracket 5.

Lower connecting member 11 is fixed to sub-frame 8, and connects to a lower side of first support bracket 4.

Lower connecting member 12 is fixed to sub-frame 8, and connects to a lower side of second support bracket 5.

Sub-frame 8 is constituted of a right sub-frame 8R and a left sub-frame 8L. More specifically, each of right sub-frame 8R and left sub-frame 8L has a front end which mates with a front end of one of respective front right member 7R and front left member 7L. Each of right sub-frame 8R and left sub-frame 8L is deflected inward in a rearward direction of the vehicular body, relative to one of respective front right member 7R and front left member 7L.

Moreover, sub-frame 8 is constituted of a front sub-frame 8Fr and a rear sub-frame 8Re. More specifically, front sub-frame 8Fr connects the front end of right sub-frame 8R to the front end of left sub-frame 8L, while rear sub-frame 8Re connects a rear end of right sub-frame 8R to a rear end of left sub-frame 8L.

Figure 5:
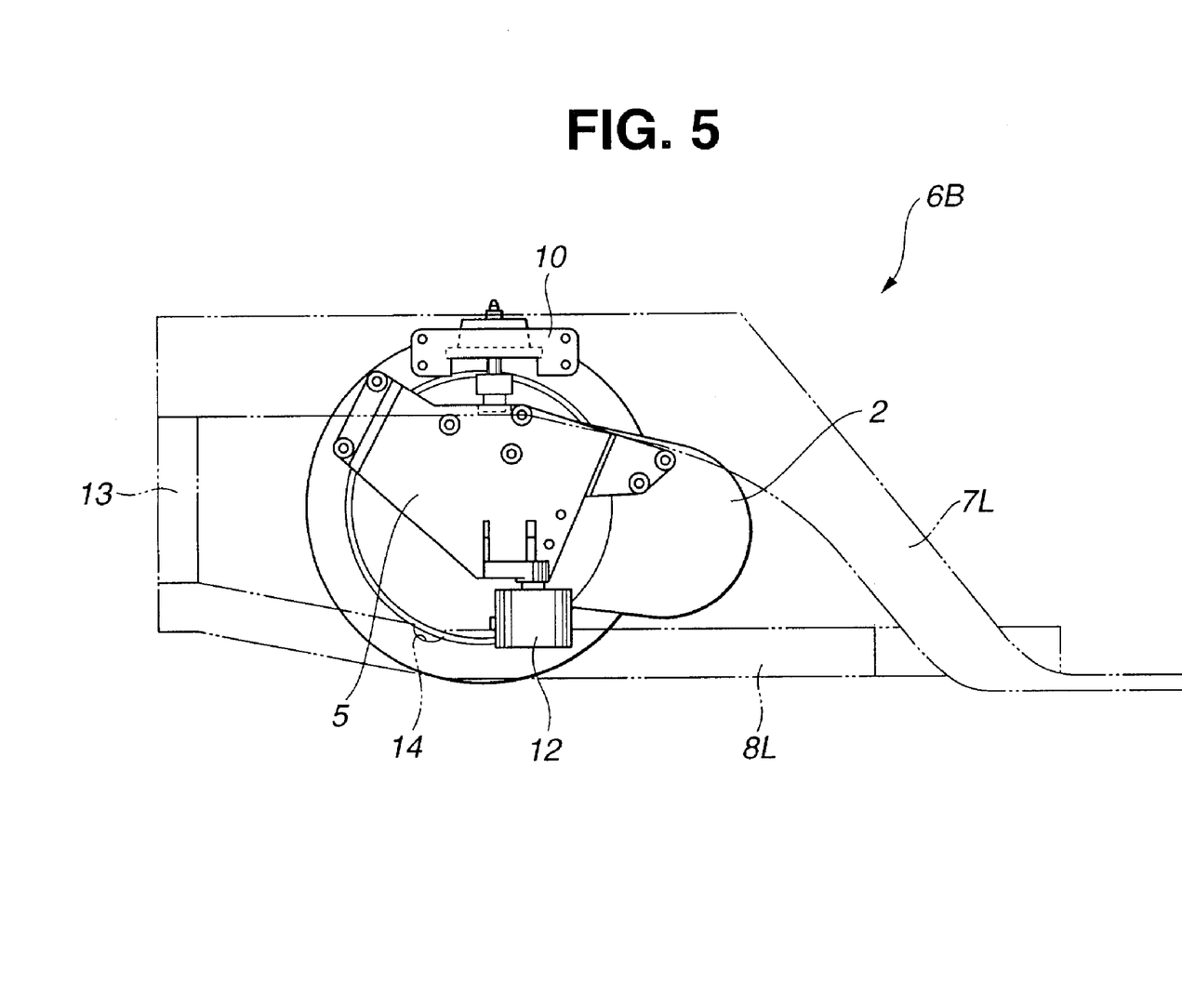
FIG. 5 is a side view of the power train support apparatus, according to the embodiment of the present invention.

As is seen in FIG. 5, left sub-frame 8L (likewise, right sub-frame 8R) has the front end inclined upward from substantially a center thereof. The front end of left sub-frame 8L connects to the front end of front left member 7L by way of a connecting member 13.

On the other hand, the rear end of each of right sub-frame 8R and left sub-frame 8L connects to a cross member (not shown).

In substantially the center and on an upper face forming the upward inclination described above, each of right sub-frame 8R and left sub-frame 8L is formed with a cutout 14. With the load (greater than or equal to its given value) applied in the fore-and-aft direction of the vehicular body, cutout 14 may encourage each of right sub-frame 8R and left sub-frame 8L to bend downward.

First support member 6A is constituted of front right member 7R, right sub-frame 8R, first suspension member 9, and lower connecting member 11. On the other hand, second support member 6B is constituted of front left member 7L, left sub-frame 8L, second suspension member 10, and lower connecting member 12.

As is seen in FIG. 1 and FIG. 2, first suspension member 9 is constituted of a support member body 9a and connecting shaft 9b. Support member body 9a shaped substantially into a mountain is tightened to an upper face of front right member 7R by means of a bolt and the like. For fixation, connecting shaft 9b is inserted into through hole 4f of upper connection 4c of first support bracket 4. By means of the bolt and the like, lower connecting member 11 is tightened rearward relative to cutout 14 on an upper face of right sub-frame 8R.

As is seen in FIG. 2, lower connecting member 11 is constituted of a support plate 111a, a rod 11b (connecting lever), and connecting shaft 11c.

Support plate 11a for supporting rod 11b has a pair of plates which are opposed to each other in such a manner that support plate 11a forms substantially a Japanese katakana character "ユ" or a rectangular English alphabet "U". For fixing rod 11b to support plate 11a by means of a pin and the like, a lower end of rod 11b is formed with a through hole 11d. Inserting connecting shaft 11c into through hole 4g of lower connection 4d of first support bracket 4 can fix an upper end of rod 11b.

As is seen in FIG. 3, second suspension member 10 is constituted of a support plate 10a, a support block 10b, and connecting shaft 10c.

Support plate 10a abuts on an inside face of front left member 7L. For fixing second suspension member 10 to front left member 7L by means of the bolts and the like, support plate 10a is formed with a plurality of through holes 10d. Support block 10b is united with support plate 10a. For fixation, connecting shaft 10c is inserted into support block 10b and through hole 5f of upper connection 5c of second support bracket 5.

Lower connecting member 12 is constituted of an insulator 12a, a mount portion 12b, and connecting shaft 12c.

Insulator 12a shaped substantially into a circular column incorporates an elastic body for reducing vibration transmitted from power train 3 to left sub-frame 8L. Mount potion 12b is disposed on a side face of insulator 12a. Moreover, for fixing lower connecting member 12 to left sub-frame 8L by means of the bolt and the like rearward relative to cutout 14 on the upper face of left sub-frame 8L, mount portion 12b is formed with a through hole 12d. Inserting connecting shaft 12c into insulator 12a and through hole 5g of lower connection 5d of second support bracket 5 can fix lower connecting member 12 to second support bracket 5.

Figure 6:
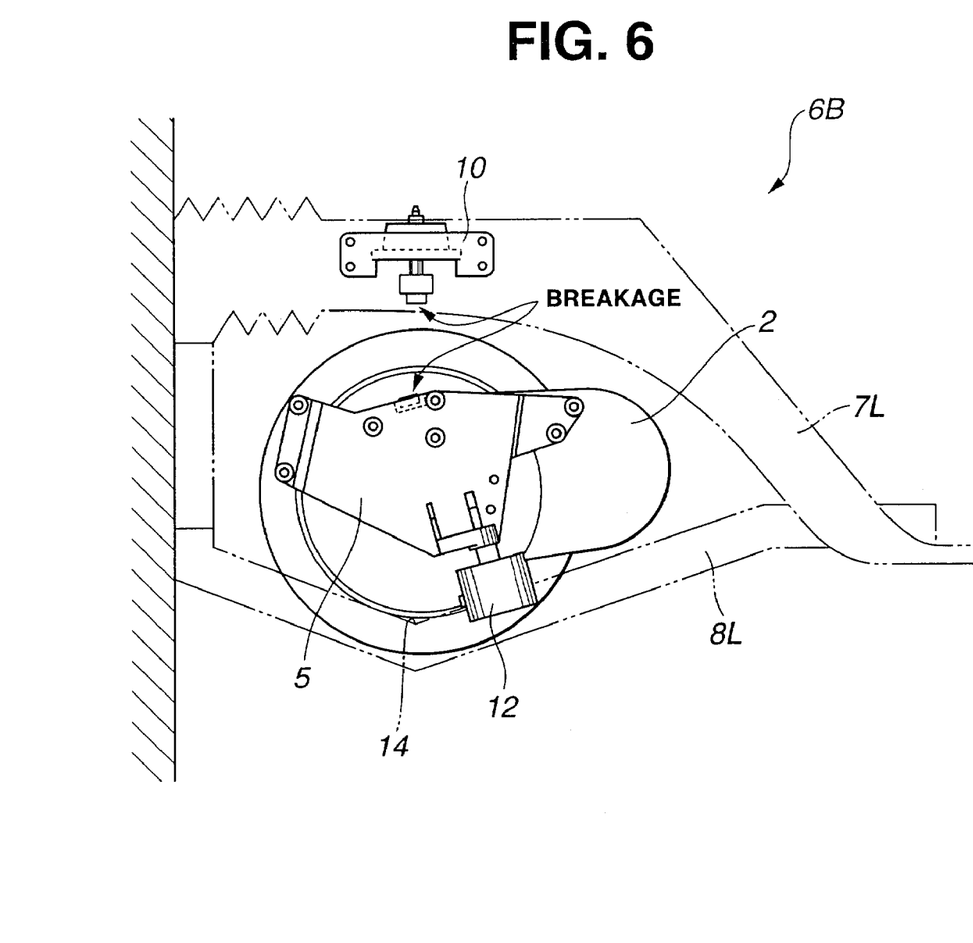
FIG. 6 shows an operation of the power train support apparatus in substantially a head-on collision of a vehicle.

Hereinafter described referring to FIG. 6 is operation of the power train support apparatus in substantially a head-on collision of the vehicle, according to the embodiment of the present invention.

Specifically described hereinafter is in terms of the operation on transaxle 2's side of power train 3. Substantially the same is applicable to engine 1's side of power train support 3. Therefore, repeated description is to be omitted.

An excessive load caused to substantially a head of the vehicle and applied rearward may be divided into two, namely, one is applied to front left member 7L and the other is applied to left sub-frame 8L.

Front left member 7L is smashed axially (horizontally in FIG. 6). On the other hand, left sub-frame 8L having the front end inclined upward from substantially the center thereof and formed with cutout 14 on substantially the center thereof (FIG. 5) may bend downward to a great extent in such a manner that cutout 14 (apex) is displaced downward.

Hereinabove, lower connecting member 12 connected to left sub-frame 8L starts the downward displacement in accordance with the left sub-frame 8L bending downward, thereby causing a great downward load (tension) to second support bracket 5 which is supported with second suspension member 10 from upper portion.

Thereafter, left sub-frame 8L further bends downward. When the downward load (tension) concentrated on breakable portion Se reaches its given value (for example, 25 kN), breakable portion Se may be broken, to thereby release support bracket body 5b from upper connection 5c connected to second suspension member 10.

As a result, second support bracket 5 and power train 3 (connected to second support bracket 5) can be dropped smoothly in accordance with the downward displacement of left sub-frame 8L, then, moved rearward in such a manner as to dive under a floor of the vehicular body.

In sum, assuredly dropping power train 3 when the excessive load is applied to the head of the vehicle can bring about the following points:

Point 1: For an engine room, securing a space sufficient to absorb the collision.

Point 2: Preventing in-vehicle space (seat occupant's space) from being oppressed due to rearward movement of high-rigidity power train 3.

The point 1 and the point 2 can protect legs of a front seat occupant.

The breakage mechanism for dropping power train 3 disposed on first support bracket 4 and second support bracket 5 (instead of first suspension member 9 and second suspension member 10) as described above can greatly contribute to deregulation of the following:

1. Configuration of first suspension member 9 and second suspension member 10.
2. Method of disposing first suspension member 9 and second suspension member 10.
3. Configuration of lower connecting member 11 and lower connecting member 12.
4. Method of disposing lower connecting member 11 and lower connecting member 12.

More specifically described as below:

All that are required of first suspension member 9 and second suspension member 10 are described as follows:

Requirement 1: Connecting respectively to front right member 7R and front left member 7L.

Requirement 2: Suspending respective first support bracket 4 and second support bracket 5.

In other words, first suspension member 9 and second suspension member 10 can be free from limitation on configuration, and limitation on disposing method relative to respective front right member 7R and front left member 7L.

All that are required of lower connecting member 11 and lower connecting member 12 are described as follows:

Requirement 3: Connecting respectively to right sub-frame 8R and left sub-frame 8L for fixing respective first support bracket 4 and second support bracket 5.

Requirement 4: Assuredly transmitting the load (for breaking respective breakable portion 4e and breakable portion Se) to respective first support bracket 4 and second support bracket 5.

Provided that the requirement 3 and the requirement 4 are met, any other connecting member can replace lower connecting member 11 and lower connecting member 12, and right sub-frame 8R and left sub-frame 8L can be free from any limitation, resulting in greatly improved free layout in the engine room.

In sum, a suspension member and a lower connecting member which are combined with a support bracket can be selected based on the following points:
1. Configuration of a power train.
2. Weight of the power train.
3. Configuration of a sub-frame.
4. Configuration of a front side member.
5. Relative location between the sub-frame and the front side member.
6. Cost performance.

With upper connection 4c and upper connection 5c united respectively with support bracket body 4b and support bracket body 5b, while lower connection 4d and lower connection 5d united respectively with support bracket body 4b and support bracket body 5b, respective first support bracket 4 and second support bracket 5 can be mounted on power train 3 with ease.

The power train support apparatus according to the embodiment of the present invention has the following construction:
1. Power train 3 is supported on engine 1's side and transaxle 2's side.
2. Lower connecting member 11 on engine 1's side has rod 11b.
3. Lower connecting member 12 on transaxle 2's side has insulator 12a.

Rod 11b cheaper than insulator 12a can contribute to preventing cost increase.

For the following cause, use of insulator 12a for lower connecting member 12 on transaxle 2's side, especially when the power support apparatus is applied to the front-drive vehicle with engine 1 located sidewise, can improve vibration-proof of the members of the vehicular body:

Cause: Vibration from a wheel is directly transmitted to transaxle 2's side.

The downward load can be applied with ease to breakable portion 4e and breakable portion 5e since breakable portion 4e and breakable portion 5e are formed on the upper part of respective first support bracket 4 and second support bracket 5.

Moreover, each of breakable portion 4e and breakable portion 5e is the cutout formed in the following manner:

The lower area of one of respective upper connection 4c and upper connection 5c is partly cut.

The above construction of the cutout can evenly break each of breakable portion 4e and breakable portion 5e in the following states:
1. In a given position.
2. With the load greater than or equal to its given value applied.

In other words, the above construction of the cutout can prevent an unexpected breakage which may be caused by comparatively a light load attributable to the vehicular body riding on a curbstone and the like.

According to the embodiment of the present invention described above, the power train support apparatus has the following construction and operation:
1. Power train 3 is fitted with first support bracket 4 having breakable portion 4e and second support bracket 5 having breakable portion 5e.
2. First support bracket 4 is suspended with first suspension member 9 fixed to front right member 7R, while second support bracket 5 is suspended with second suspension member 10 fixed to front left member 7L.
3. First support bracket 4 is supported with lower connecting member 11 fixed to right sub-frame 8R, while second support bracket 5 is supported with lower connecting member 12 fixed to left sub-frame 8L.
4. Bending downward right sub-frame 8R (i.e., pulling down right sub-frame 8R by way of lower connecting member 11 fixed to right sub-frame 8R) breaks breakable portion 4e; while bending downward left sub-frame 8L (i.e., pulling down left sub-frame 8L by way of lower connecting member 12 fixed to left sub-frame 8L) breaks breakable portion 5e.

With the above construction and operation of the power train support apparatus, power train 3 can be assuredly dropped when the excessive load is applied rearward to the head of the vehicle.

Moreover, the above construction and operation of the power train support apparatus can deregulate the limitation on the configuration and the disposing method of first suspension member 9, second suspension member 10, lower connecting member 11 and lower connecting member 12.

Although the present invention has been described above by reference to a certain embodiment, the present invention is not limited to the embodiment described above. Modifications and variations of the embodiment described above will occur to those skilled in the art, in light of the above teachings.

More specifically described as below:

The power train support apparatus according to the embodiment is applied to the front engine and front wheel drive vehicle (FF). The present invention is, however, not limited to the above. The power train support apparatus under the present invention is applicable to other vehicles including a front engine and rear wheel drive vehicle (FR), a rear engine and rear wheel drive vehicle (RR). Moreover, the power train support apparatus under the present invention is applicable to an electric vehicle with an electric motor as a driving source of revolution.

In addition, according to the embodiment of the present invention, breakable portion 4e, 5e is the cutout which is the area partly cut between the support bracket body 4b, 5b and the upper connection 4c, 5c. The present invention, however, not limited to the above. Reducing thickness partly between the support bracket body 4b, 5b and the upper connection 4c, 5c, or forming a plurality of through holes along the breakable portion 4e, 5e is allowed. What is of importance is to assuredly break the area between the support bracket body 4b, 5b and the upper connection 4c, 5c with the load applied to the given position. In sum, breakable portion 4e, 5e is arbitrary in terms of configuration.

In addition, according to the embodiment of the present invention, power train 3 is supported at two portions, namely, on transaxle 2's side and engine 1's side. The present invention is, however, not limited to the above. Supporting power train 3 at the center, or at three portions or more is allowed. What is of importance is to assuredly move power train 3 downward when sub-frame 8 is bent downward attributable to the substantially head-on collision of the vehicle. In sum, the number of portions for supporting power train 3 is arbitrary.

In addition, according to the embodiment of the present invention, rod 11b is used for lower connecting member 11 on engine 1's side for preventing the cost increase. The present invention is, however, not limited to the above. Improving vibration-proof of power train 3 preferably uses an insulator for lower connecting member 11 on engine 1's side, and more preferably, for first suspension member 9 and second suspension member 10.

In addition, according to the embodiment of the present invention, lower connection 4d and lower connection 5d of respective first support bracket 4 and second support bracket 5 are connected to respective lower connecting member 11 and lower connecting member 12. The present invention is, however, not limited to the above. With lower connection 4d and lower connection 5d omitted, the following construction is allowed:

Using a lower connecting member (such as an engine mount fixed to right sub-frame 8R and left sub-frame 8L) directly supporting power train 3, so as to apply the downward load to respective first support bracket 4 and second support bracket 5 by way of power train 3 when respective right sub-frame 8R and left sub-frame 8L bend downward.

This application is based on a prior Japanese Patent Application No. P2002-135810 (filed on May 10, 2002 in Japan). The entire contents of the Japanese Patent Application No. P2002-135810 from which priority is claimed is incorporated herein by reference, in order to take some protection against mis-translation or omitted portions.

The scope of the present invention is defined with reference to the following claims.

What is claimed is:

1. A power train support apparatus for supporting a power train which is adapted to be dropped with a load greater than or equal to a given value thereof applied substantially in a fore-and-aft direction of a vehicular body, the power train support apparatus comprising:
a support bracket mounted to the power train, the support bracket comprising an upper connection at least which is suspended from a support member of the vehicular body, the support bracket being formed with a breakable portion which is breakable with a load greater than or equal to a given value thereof applied substantially downward from the upper connection;
wherein the support member is adapted to pull the power train downward so as to cause the downward load to be applied to the breakable portion; and
wherein the support member includes a main skeleton member extending substantially in the fore-and-aft direction of the vehicular body, a sub-skeleton member disposed below the main skeleton member, and a suspension member being fixed to the main skeleton member, and suspending the upper connection of the support bracket.

2. The power train support apparatus as claimed in claim 1, wherein
the breakable portion is formed lower than the upper connection, and higher than a portion mounted to the power train.

3. The power train support apparatus as claimed in claim 1, wherein
the breakable portion is a cutout which is formed lower than the upper connection.

4. The power train support apparatus as claimed in claim 1, wherein
the breakable portion has a reduced thickness partly between a support bracket bodyand the upper connection.

5. The power train support apparatus as claimed in claim 1, wherein the support bracket includes a lower connection being connected to the support member of the vehicular body.

6. A power train support apparatus for supporting a power train which is adapted to be dropped with a load greater than or equal to a given value thereof applied substantially in a fore-and-aft direction of a vehicular body, the power train support apparatus comprising:
a support bracket mounted to the power train, the support bracket comprising an upper connection at least which is suspended from a support member of the vehicular body, the support bracket being formed with a breakable portion which is breakable with a load greater than or equal to a given value thereof applied substantially downward from the upper connection;
wherein the support member is adapted to pull the power train downward so as to cause the downward load to be applied to the breakable portion,
wherein the support member of the vehicular body comprises:
i) a main skeleton member extending substantially in the fore-and-aft direction of the vehicular body;
ii) a sub-skeleton member disposed below the main skeleton member, with the load greater than or equal to the given value thereof applied substantially in the fore-and-aft direction of the vehicular body, the sub-skeleton member being so bent downward as to pull the power train downward; and
iii) a suspension member fixed to the main skeleton member, the suspension member suspending the upper connection of the support bracket.

7. The power train support apparatus as claimed in claim 6, wherein the suspension member includes an insulator.

8. A power train support apparatus for supporting a power train which is adapted to be dropped with a load greater than or equal to a given value thereof applied substantially in a fore-and-aft direction of a vehicular body, the power train support apparatus comprising:
a support bracket mounted to the power train, the support bracket comprising an upper connection at least which is suspended from a support member of the vehicular body, the support bracket being formed with a breakable portion which is breakable with a load greater than or equal to a given value thereof applied substantially downward from the upper connection;
wherein the support member is adapted to pull the power train downward so as to cause the downward load to be applied to the breakable portion,
wherein the support member of the vehicular body comprises:
i) a main skeleton member extending substantially in the fore-and-aft direction of the vehicular body;
ii) a sub-skeleton member disposed below the main skeleton member, with the load greater than or equal to the given value thereof applied substantially in the fore-and-aft direction of the vehicular body, the sub-skeleton member being bent downward;
iii) a suspension member fixed to the main skeleton member, the suspension member suspending the upper connection of the support bracket; and iv) a lower connecting member fixed to the sub-skeleton member, the lower connecting member being connected to a lower connection of the support bracket.

9. A power train support apparatus for supporting a power train which is adapted to be dropped with a load greater than or equal to a given value thereof applied substantially in a fore-and-aft direction of a vehicular body, the power train support apparatus comprising:

a support bracket mounted to the power train, the support bracket comprising an upper connection at least which is suspended from a support member of the vehicular body, the support bracket being formed with a breakable portion which is breakable with a load greater than or equal to a given value thereof applied substantially downward from the upper connection, wherein A) the support bracket comprises:
i) a first support bracket disposed on a driving source's side of the power train, the driving source being a source for a revolution, the first support bracket being formed with the breakable portion; and
ii) a second support bracket disposed on a transmission's side of the power train, the second support bracket being formed with the breakable portion, B) the support member of the vehicular body comprises a first support member and a second support member each of which comprises:
i) a main skeleton member extending substantially in the fore-and-aft direction of the vehicular body;
ii) a sub-skeleton member disposed below the main skeleton member, with the load greater than or equal to the given value thereof applied substantially in the fore-and-aft direction of the vehicular body, the sub-skeleton member being bent downward;
iii) a suspension member fixed to the main skeleton member, the suspension member suspending the upper connection of one of the first support bracket and the second support bracket; and
iv) a lower connecting member fixed to the sub-skeleton member, the lower connecting member being connected to a lower connection of the one of the first support bracket and the second support bracket.

10. The power train support apparatus as claimed in claim 9, wherein
the lower connecting member of at least one of the first support member and the second support member includes an insulator.

11. The power train support apparatus as claimed in claim 9, wherein
the lower connecting member of one of the first support member and the second support member includes an insulator, and
the lower connecting member of the other of the first support member and the second support member includes a connecting lever.

12. The power train support apparatus as claimed in claim 9, wherein
the lower connecting member of the second support member includes an insulator.

13. The power train support apparatus as claimed in claim 9, wherein
a strength connecting the suspension member to the upper connection is designed higher than a strength of the breakable portion disposed between the upper connection and a support bracket body, and
a strength connecting the lower connecting member to the lower connection is designed higher than the strength of the breakable portion.

14. The power train support apparatus as claimed in claim 9, wherein
the main skeleton member comprises a first main skeleton member and a second main skeleton member,
the sub-skeleton member comprises a first sub-skeleton member and a second sub-skeleton member,
each of the first sub-skeleton member and the second sub-skeleton member has a front end which mates with a front end of one of the first main skeleton member and the second main skeleton member respectively, and
each of the first sub-skeleton member and the second sub-skeleton member is deflected inward in a rearward direction of the vehicular body, relative to one of the first main skeleton member and the second main skeleton member respectively.

15. The power train support apparatus as claimed in claim 14, wherein
the sub-skeleton member further comprises:
i) a front sub-skeleton member, and
ii) a rear sub-skeleton member,
the front sub-skeleton member connecting the front end of the first sub-skeleton member to the front end of the second sub-skeleton member, while the rear sub-skeleton member connecting a rear end of the first sub-skeleton member to a rear end of the second sub-skeleton member.

16. The power train support apparatus as claimed in claim 15, wherein
each of the first sub-skeleton member and the second sub-skeleton member has the front end inclined upward from substantially a center thereof, the front end of each of the first sub-skeleton member and the second sub-skeleton member connecting, by way of a connecting member, to the front end of one of the first main skeleton member and the second main skeleton member respectively.

17. The power train support apparatus as claimed in claim 16, wherein
in substantially a center and on an upper face forming the upward inclination, each of the first sub-skeleton member and the second sub-skeleton member is formed with a cutout, and
with the load greater than or equal to the given value thereof applied in the fore-and-aft direction of the vehicular body, the cutout encourages each of the first sub-skeleton member and the second sub-skeleton member to bend downward.

18. The power train support apparatus as claimed in claim 9, wherein the power train is supported at the driving source's side which is an engine's side and the transmission's side which is a transaxle's side.

19. The power train support apparatus as claimed in claim 9, wherein the power train is supported at a center thereof.

20. The power train support apparatus as claimed in claim 9, wherein the power train is supported at three portions or more.

* * * * *